United States Patent
Sevigny

(10) Patent No.: US 8,917,997 B2
(45) Date of Patent: Dec. 23, 2014

(54) COLLIMATED BEAM CHANNEL WITH FOUR LENS OPTICAL SURFACES

(71) Applicant: Applied Micro Circuits Corporation, Sunnyvale, CA (US)

(72) Inventor: Benoit Sevigny, Mountain View, CA (US)

(73) Assignees: Applied Micro Circuits Corporation, Sunnyvale, CA (US); Volex PLC, London (GB)

( * ) Notice: Subject to any disclaimer, the term of this patent is extended or adjusted under 35 U.S.C. 154(b) by 287 days.

(21) Appl. No.: 13/645,627

(22) Filed: Oct. 5, 2012

(65) Prior Publication Data
US 2014/0099125 A1     Apr. 10, 2014

(51) Int. Cl.
*H04B 10/00*     (2013.01)

(52) U.S. Cl.
USPC .......................................... 398/141; 398/140

(58) Field of Classification Search
CPC ................................. H04B 10/00; G02B 6/26
USPC .................................................. 398/140–141
See application file for complete search history.

(56) References Cited

U.S. PATENT DOCUMENTS

| | | | | |
|---|---|---|---|---|
| 5,343,194 A * | 8/1994 | Bowdon | .................... | 340/2.22 |
| 5,861,972 A * | 1/1999 | Tomooka et al. | ............. | 398/181 |
| 5,963,684 A * | 10/1999 | Ford et al. | ....................... | 385/24 |
| 6,538,777 B1 * | 3/2003 | Barry et al. | .................... | 398/25 |
| 6,603,822 B2 * | 8/2003 | Brede et al. | ................... | 375/340 |
| 6,614,957 B2 * | 9/2003 | Wyeth et al. | .................... | 385/33 |
| 6,671,256 B1 * | 12/2003 | Xiong et al. | ................... | 370/230 |
| 6,683,727 B1 * | 1/2004 | Goring et al. | ................. | 359/639 |
| 6,694,100 B1 * | 2/2004 | Fatehi et al. | .................... | 398/99 |
| 6,741,572 B1 * | 5/2004 | Graves et al. | ................. | 370/254 |
| 6,973,229 B1 * | 12/2005 | Tzathas et al. | .................. | 385/16 |
| 7,054,557 B1 * | 5/2006 | Dasylva et al. | ................. | 398/48 |
| 7,079,566 B2 * | 7/2006 | Kido et al. | ..................... | 372/101 |
| 7,082,266 B1 * | 7/2006 | Shin | ................ | 398/79 |
| 7,092,633 B2 * | 8/2006 | Fumagalli et al. | ............. | 398/59 |
| 7,120,357 B2 * | 10/2006 | Doukai | .......................... | 398/43 |
| 2002/0018261 A1 * | 2/2002 | Takeguchi et al. | ............ | 359/124 |
| 2002/0071635 A1 * | 6/2002 | Wyeth et al. | .................... | 385/33 |
| 2002/0126343 A1 * | 9/2002 | Fumagalli et al. | ............ | 359/118 |
| 2003/0214571 A1 * | 11/2003 | Ishikawa et al. | ............. | 347/255 |
| 2004/0190915 A1 * | 9/2004 | Murray et al. | ................ | 398/212 |
| 2004/0208559 A1 * | 10/2004 | Krishnaswamy et al. | ...... | 398/59 |
| 2004/0213587 A1 * | 10/2004 | Conchas et al. | ............. | 398/212 |
| 2005/0031354 A1 * | 2/2005 | Ohashi et al. | ................ | 398/141 |
| 2005/0147411 A1 * | 7/2005 | Hamou et al. | .................. | 398/59 |
| 2005/0270616 A1 * | 12/2005 | Weiner | .......................... | 359/246 |
| 2006/0008238 A1 * | 1/2006 | Suzuki et al. | ................. | 385/147 |
| 2006/0165411 A1 * | 7/2006 | Schluter | ........................... | 398/33 |
| 2006/0171713 A1 * | 8/2006 | Feng | ........................... | 398/69 |
| 2006/0221423 A1 * | 10/2006 | Ishihara | ........................ | 359/207 |
| 2007/0081764 A1 * | 4/2007 | Deliwala | ........................ | 385/29 |
| 2007/0160323 A1 * | 7/2007 | Deliwala | ........................ | 385/28 |

(Continued)

*Primary Examiner* — Agustin Bello
(74) *Attorney, Agent, or Firm* — Baker & Hostetler LLP

(57) ABSTRACT

An optical system and method disclosed include a first lens component and a second lens component within the receive path or the transmit path. The first lens component includes at least two aspheric surfaces that oppose one another and generate a collimated beam channel. The second lens component generates a converging beam and magnifies the converging beam with a magnification factor that is different from a magnification factor in the other path, either the receive path or the transmit path. The receive path and the transmit path include symmetrical lengths and asymmetrical magnification factors.

20 Claims, 10 Drawing Sheets

(56) References Cited

U.S. PATENT DOCUMENTS

2008/0008472 A1* 1/2008 Dress et al. .................. 398/66
2008/0124087 A1* 5/2008 Hartmann et al. ............ 398/115
2009/0022491 A1* 1/2009 Takemoto .................... 398/34
2011/0103409 A1* 5/2011 Sipes, Jr. ..................... 372/6
2012/0002687 A1* 1/2012 Ershov et al. ................ 372/20
2012/0237221 A1* 9/2012 Marsland, Jr. ............... 398/65
2012/0251105 A1* 10/2012 Kwok et al. ................. 398/44
2014/0099125 A1* 4/2014 Sevigny ...................... 398/141

* cited by examiner

COLLIMATED BEAM CHANNEL WITH FOUR LENS OPTICAL SURFACES

TECHNICAL FIELD

The subject application relates to optical systems forming a collimated beam channel, and, in particular, a collimated beam channel having lenses with at least four optical surfaces.

BACKGROUND

Advances in technology have made communication using electromagnetic waves are the most reliable and fastest ways of communicating information between points. In general, electromagnetic communication systems generate information at a source (e.g., transmitter). Information is transmit as a signal through a channel, such as free space in radio applications, electronic lines in telephone and internet applications, or optic fibers in fiber optic applications. During transmission, a channel propagating information usually induces loss in a signal and/or distorts the signal. Likewise, various other mechanics may introduce noise in a signal. A signal is typically received by a receiver which can utilize and/or decode the signal.

An optic engine or transmitter utilizes a laser diode (LD) or light-emitting diode (LED) to encode data through modulation, such as amplitude modulation (AM), frequency modulation (FM), and digital modulation. LD and LED sources commonly generate signals with wavelengths in a range from 660 nanometers (nm) to 1,550 nm. Encoded data is propagated through an optic fiber (e.g., silicon). Optic fibers, couple to an optical receiver which detects, amplifies, and decodes (demodulates) the encoded data.

The above-described deficiencies are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

The following presents a simplified summary in order to provide a basic understanding of some aspects disclosed herein. This summary is not an extensive overview. It is intended to neither identify key or critical elements nor delineate the scope of the aspects disclosed. Its sole purpose is to present some concepts in a simplified form as a prelude to the more detailed description that is presented later.

Various embodiments are disclosed for an optical system. An exemplary system comprises an optical transmitter component configured for converting a message having a first format into a second different format for a transmission of the message. An optical receiver component is configured for receiving the message in the second different format. An information channel component is configured for carrying the message in the second different format along a guided pathway having a receive channel and a transmit channel. A first lens component is configured for generating a collimated beam along an optical axis, and a second lens component is configured for directing and magnifying the collimated beam with an asymmetrical magnification factor with respect to the receive channel and the transmit channel.

In another non-limiting embodiment, a system is disclosed having a collimated beam channel configured for optically coupling a beam source to a fiber optic guided pathway. The collimated beam channel comprises a first optical lens component configured for receiving an optical beam from the beam source and generating a collimated beam along an optical axis. The first optical lens component includes a first aspheric surface configured for receiving the optical beam and a second aspheric surface opposite to and transverse to the first aspheric surface. The collimated beam channel includes a second optical lens component configured for receiving the collimated beam at a third convex surface and magnifying the received collimated beam with a fourth curved surface towards an end face of the fiber optic guided pathway.

In yet another non-limiting embodiment, an exemplary method for optically communicating a light beam, comprises transmitting, via a beam source component, the optical beam along an optical axis of a transmit path. The optical beam is transmitted at a first lens component having a first aspheric surface and a second aspheric surface opposing the first aspheric surface into a collimated beam. The collimated beam is with a second lens component downstream of the first lens component at a third convergent surface. The collimated beam is transformed into a converging beam, and the converging beam is magnified along a receive path with a fourth verging surface that is opposite to the third convergent surface of the second lens component.

The following description and the annexed drawings set forth in detail certain illustrative aspects of the disclosed subject matter. These aspects are indicative, however, of but a few of the various ways in which the principles of the various embodiments may be employed. The disclosed subject matter is intended to include all such aspects and their equivalents. Other advantages and distinctive features of the disclosed subject matter will become apparent from the following detailed description of the various embodiments when considered in conjunction with the drawings.

BRIEF DESCRIPTION OF DRAWINGS

Non-limiting and non-exhaustive embodiments of the subject disclosure are described with reference to the following figures, wherein like reference numerals refer to like parts throughout the various views unless otherwise specified.

FIG. 10 is a block diagram representing an exemplary non-limiting computing system or operating environment in

DETAILED DESCRIPTION

Figure 1:
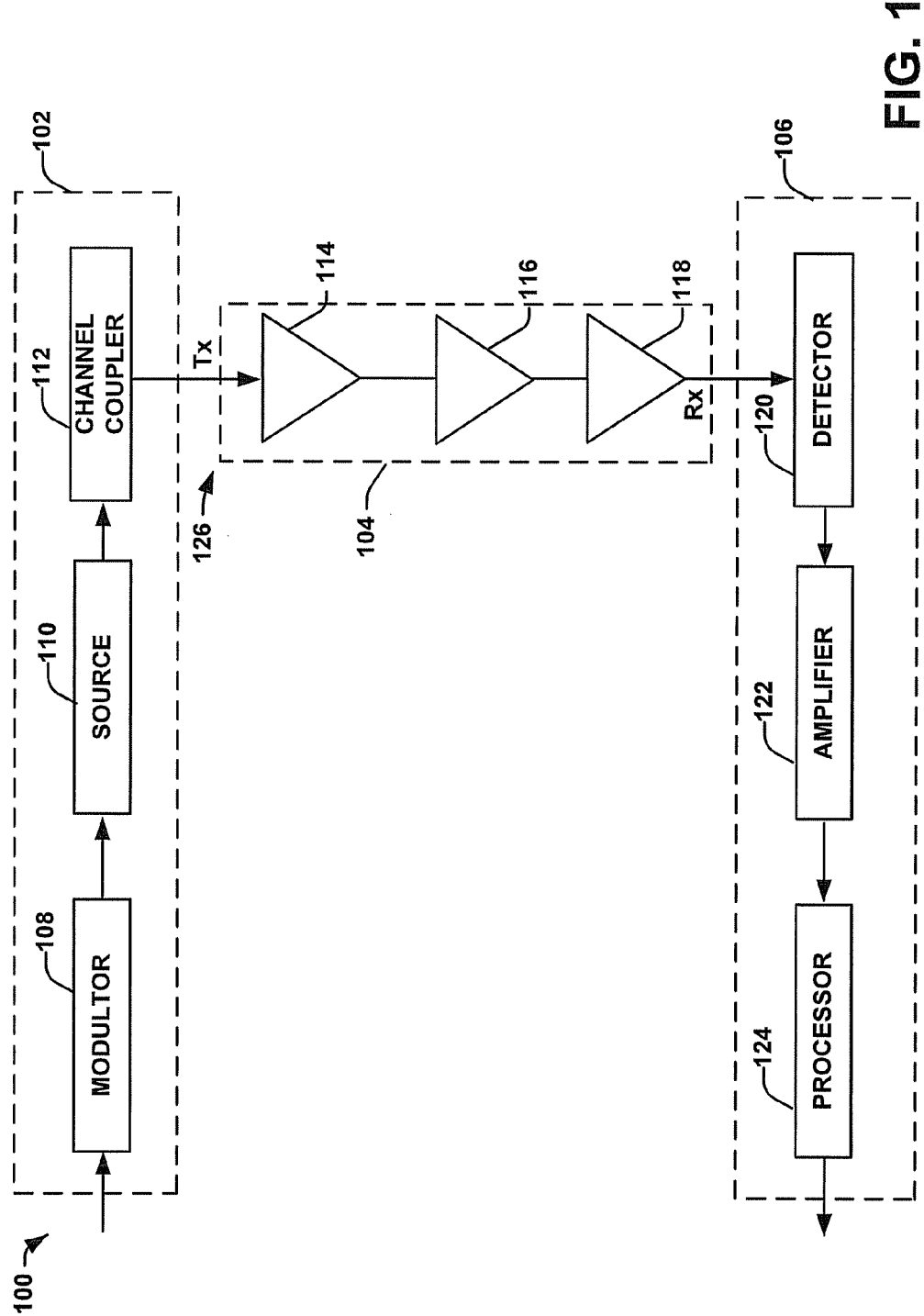
FIG. 1 illustrates an example optical system in accordance with various aspects described herein.

Embodiments and examples are described below with reference to the drawings, wherein like reference numerals are used to refer to like elements throughout. In the following description, for purposes of explanation, numerous specific details in the form of examples are set forth in order to provide a thorough understanding of the various embodiments. It will be evident, however, that these specific details are not necessary to the practice of such embodiments. In other instances, well-known structures and devices are shown in block diagram form in order to facilitate description of the various embodiments.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon such as with a module, for example. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Overview

In consideration of the above-described deficiencies among other things, various embodiments are provided for optical systems and optical components to process optical signals or messages in a collimated beam channel. An optical system, for example, includes a laser source, beam source and/or optical source that can provide a wave, in which information is transmitted. In an example embodiment, an optical transmitter component is configured to convert a message having a first format (e.g., an electronic format) into a second different format (e.g., an optical format) for a message transmission. An information channel component is configured to carry the message in the second different format along a guided pathway (e.g., a fiber optic cable or the like). The optical system has a receive channel and a transmit channel that includes a collimated beam respectively. A first lens component of the optical system is configured to generate the collimated beam along an optical axis. A second lens component is located along the optical axis downstream of the optical source and the first lens.

The first lens component includes a first lens having a first surface and a second surface that is opposite to and transposed along the first surface. The first surface and the second surface of the lens represent an aspheric surface respectively, in which surface profiles are not portions of a sphere or cylinder and are operable to reduce or eliminate spherical aberration as well as reduce other optical aberrations. The second lens component includes at least two surfaces configured to direct and magnify the collimated beam with an asymmetrical magnification factor with respect to the receive channel and the transmit channel of the optical system.

Collimated Beam Channel with Four Lens Optical Surfaces

Referring initially to FIG. 1, illustrated is an optical system 100 for communication with an optical beam in accordance with various embodiments in this disclosure. System 100 can include a memory that stores computer executable components and a processor that executes computer executable components stored in the memory, examples of which can be found with reference to FIG. 9. It is to be appreciated that the computer 902 can be used in connection with implementing one or more of the systems or components shown and described in connection with FIG. 1 and as well as other figures disclosed herein. System 100 is one example architecture of an optical system in which the components of the system can be combined and/or operate externally to one another in different architectures. For example, the system 100 includes a transmitter component 102, an information channel component 104 and a receiver component 106, in which any number of the components can be separate and/or combined as one component, such as an optical transceiver component that includes at least the transmitter component 102 and the receiver component 106.

The transmitter component 102 of the system 100 includes a modulator component 108, an optical or carrier source component 110 and a channel coupler component 112. The transmitter component 102 operates as an optical transmitter that converts messages inputted into one format (e.g., an electronic format) into a different format (e.g., an optical format). The modulator component 108 converts a message into a proper format (e.g., analog, digital) for transmission in the system 100 (e.g., analog, digital), and is further configured to impress the message onto a wave (e.g., an optical wave). The source component 110 generates the carrier wave on which the information from the modulator component 108 is transmitted (e.g., in an optical wave format), which can be generated from an optical oscillator (not shown) such as an LD or LED, for example. The channel coupler 112 operates to feed power into the information guide 104, such as an optical cable. The channel coupler 112 operates to direct an optical beam toward the information guide 104 by generating a collimated beam channel onto an end surface 126, for example. The transmitter component 102 interfaces with an information guide component 104 that includes a guided information pathway, such as an optical fiber or other functioning guide for the optical transmission of data over a defined distance.

The information guide 104 includes a transmit channel (Tx), a receive channel (Rx), one or more optical amplifiers and/or repeaters 114, 116, and 118, and is configured to communicatively couple the transmitter component 102 with the receiver component 106. The optical amplifiers of the information guide 104 operate to boost power levels and ensure sufficient power to the receiver component 106. Optical repeaters (regenerators) can also convert weak and distorted optical signals to electrical ones and then regenerate the original digital pulse trains for further transmission, in which any of the components 114, 116 and/or 118 can operate as an optical amplifier and/or an optical repeater based on design of the information guide 104, and the system architecture.

The receiver component 106 includes a detector 120, an amplifier 122 and a processing unit (e.g., a processor). The detector 120 operates to convert the optical into an electronic current or another different format, for example. The detector 120 can include a photo detector that demodulates the optical signal received through the receive channel Rx and the information guide 104. The amplifier 122 can operate to amplify or remove any bias of the data in electrical form for processing at the processing unit 124, which can further amplify and/or filter the current for quality communications.

In one embodiment, the receive channel Rx and the transmit channel Tx are of equal lengths and/or of equal distances with respect to one another. An advantage of having substantially similar lengths in the Rx channel and the Tx channel is that a reference is provided for balancing tolerances in both channels; however as a result, tolerances in signal transmission can become an increasingly limiting factor in the information guide 104 such as with fiber optics supporting multiple modes. For example, the information guide 104 can include a plurality of modes, in which can present a difficulty involving the difference between the transverse radiation pattern of the source 110 and the mode patterns of waveguide modes in the information channel 104. Exact coupling with the waveguide can be difficult unless the optic beam patterns are substantially identical, or, in other words, substantially matched. For example, rays associated with different modes have each mode excited by a plane wave incident on a slab therein such that the internal angle of the beam is a desired value to guide the beam. As such, coupling the optical beam from the source 110 to the information guide component 104 and also to the detector 120 is provided with symmetrical channels in length or in distance with respect to space.

In addition, substantially symmetrical distances in the Rx channel and the Tx channel can make tolerances in the "spot size" difficult, or, in other words, the size of the optical beam onto the detector 120 can become tightly constrained without changing the length of the receive channel. In addition, magnification factors of the channels are also substantially equal when both second lenses have planar fourth surfaces. In another embodiment, the receive channel can include an output coupler, which is described further below, that includes an additional fourth lens surface to substantially increase tolerance levels of the "spot size" without altering a thickness of the lens and maintaining a substantially equal distance of the Rx and Tx channels.

Figure 2:
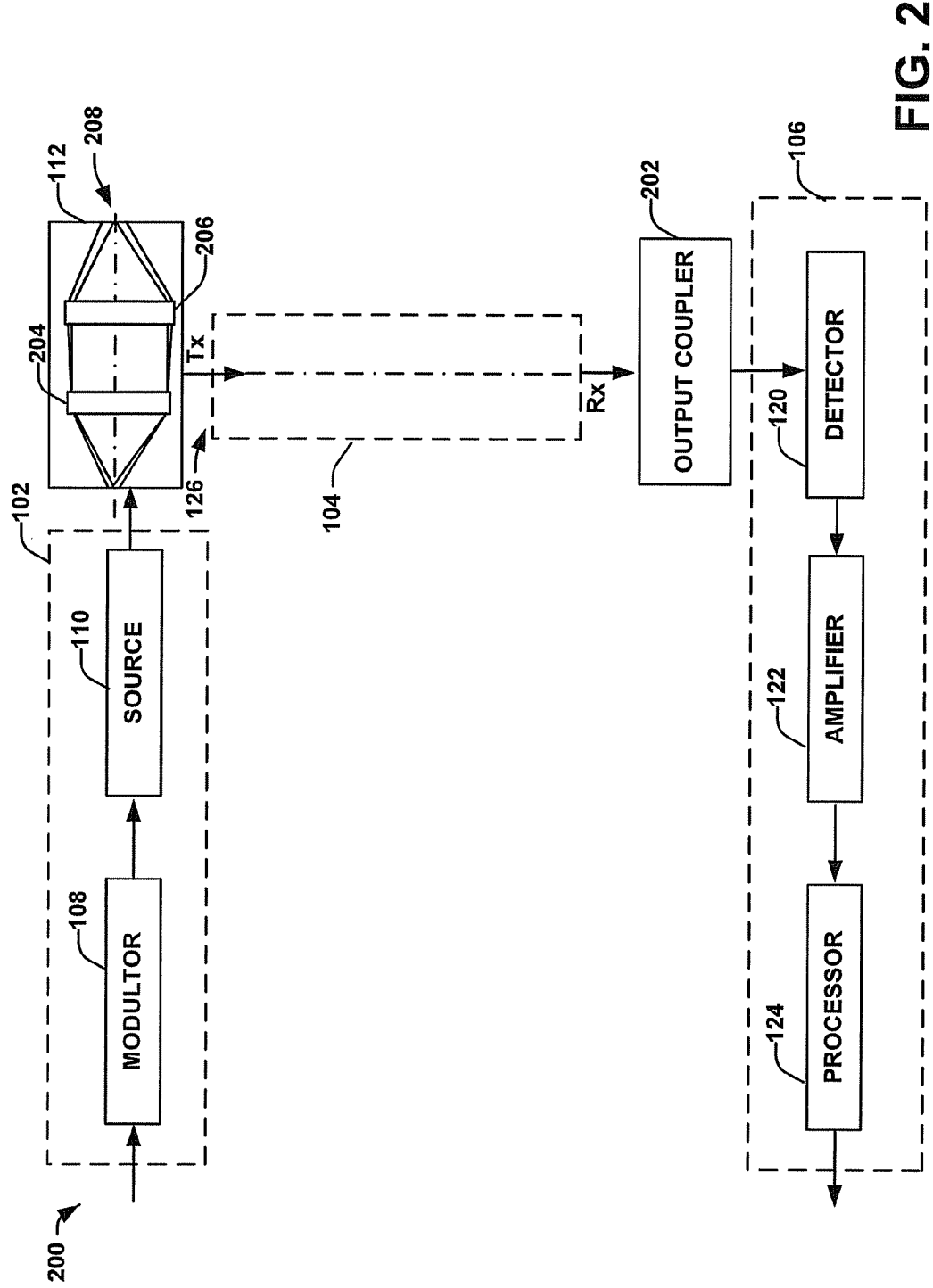
FIG. 2 illustrates another example optical system in accordance with various aspects described herein.

Referring now to FIG. 2, illustrated is another exemplary system 200 in accordance with various embodiments described in this disclosure. The system 200 is an optical system that is similar to the system 100 described above and with the channel coupler 112 included within the transmit channel 112. Additionally, the system 100 further includes an output coupler 202 as part of the receive channel Rx.

The output coupler 202 of the optic system 200 operates to direct light emerging from the fiber onto the light detector 202. For example, the output coupler 202 radiates the optical transmission through the information channel 104 in an identical or substantially equal pattern as the acceptance cone received at the fiber end face 126 of the information channel 104. The output coupler 202 can, for example, include similar or the same component as with the channel coupler 112.

In one embodiment, the Tx channels and the Rx channels include a plurality of lenses for focusing and/or directing the optical beam. The channel coupler 112 includes a first lens component 204 and a second lens component 112 for coupling the optical beam along an optical axis 208. The first lens component 204 comprises a first lens that has at least two surfaces that are opposite to and transverse to one another for manipulating the optical beam along the optical axis 208 in a collimated beam pattern. The second lens component 206 is located downstream of the first lens component. Although the second lens component 206 is illustrated along the optical axis 208 for ease of illustration, other configurations are also envisioned herein, in which the collimated beam generated along the optical axis 208 by the first lens component can be directed in a collimated beam pattern by being diverted, shifted, and/or angled along a different axis via additional or intermediate optical components (not shown) to the second lens component 206.

In another embodiment, the second lens component 206 includes a third surface and a fourth surface that oppose one another along the optical axis 208. The third surface is configured to receive the collimated beam downstream of the first lens component 204. The second lens component 206 receives the collimated beam at the third surface and is configured to converge the beam inward toward and traversing the optical axis 208.

The second lens component 206 operates with the fourth surface as a magnifying surface to magnify the optical beam that is being converged to generate a small concentrated "spot size" onto the fiber end face 126 for the transmission of optical power. The fourth surface is opposite to the third surface and faces the optical end face. The fourth surface includes a curvature that enables the second lens component to operate as tunable magnifying component that converges a collimated beam in a collimated beam channel and alters the magnification selectively differently in one channel (Rx, Tx) with respect to the other channel (Rx, Tx).

Figure 3:
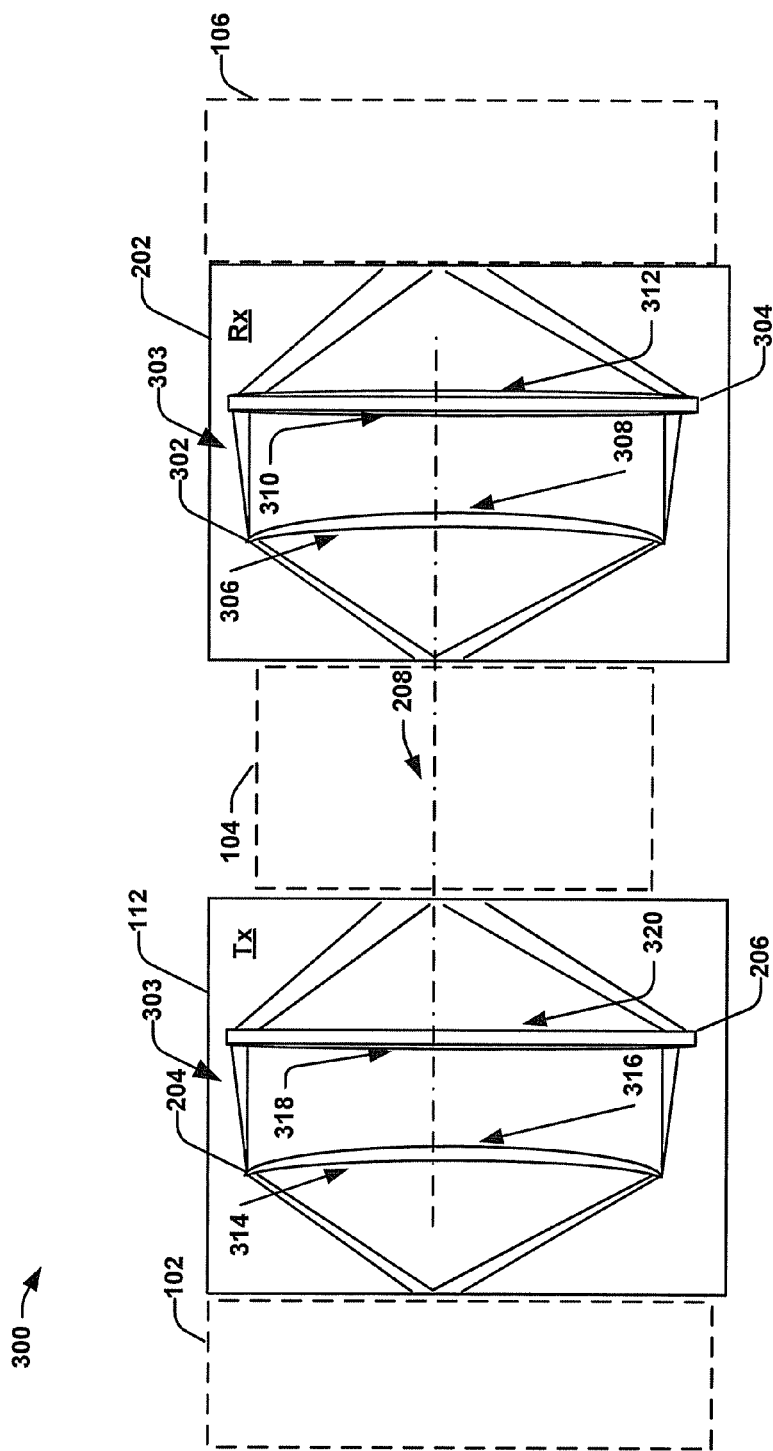
FIG. 3 illustrates another example optical system in accordance with various aspects described herein.

Referring to FIG. 3, illustrates an example system 300 with optical components in accordance with various embodiments described. The system 300 includes similar optical components as discussed above with the transmitter component 102, the carrier coupler 112, the information channel component 104, the output coupler 202 and the receiver component 106.

The carrier coupler 112 and the output coupler 202 respectively comprise the transmit channel Tx and the receive channel Rx. The transmit channel Tx of the carrier coupler 112 includes the first lens component 204 and the second lens component 206. The receive channel Rx of the output coupler 202 also includes a first lens component 302 of the receive channel Rx and a second lens component 304 of the receive channel Rx.

In one embodiment, the surfaces of the second lens component of the receive channel Rx and the second lens component of the transmit channel Tx differ while parameters of the components and pathways in the transmit channel Tx and the receive channel Rx are substantially equal, identical and/or symmetrical. For example, the first lens component 302 of the receive chancel Rx includes at least two opposing lens surfaces along the optical beam path. The surface 310 is a convergent lens surface that converges a collimated beam 303 towards the optical axis and onto the receiver component 106 (e.g., a photo detector). The surface 312 of the second lens component of the receive channel Rx includes a curved surface that alters a magnification of the converging beam in the receive channel Rx from a magnification of the optical beam in the transmit channel Tx.

For example, the receive channel Rx, or receive path, includes the first lens component 302 that has a first lens surface 306 and a second lens surface 308, which are aspheric in curvature and oppositely transposed to one another. The second lens component 304 includes a third surface 310 and a fourth surface 312 that opposes the third surface 310. The fourth surface 312 is curved and operates as a verging surface that verges the converged collimated beam according to a magnification factor that is different than a magnification of the optical beam emanating from the transmit component 112 and onto the information channel component 104. The third surface 310 of the second lens component operates as a convergent or convex surface that operates to direct the collimated beam channel 303 towards the optical axis 208 and onto a small spot size area of the receive component 106.

In another embodiment, the carrier channel component 112, included in the transmit channel Tx, or transmit path, comprises the first lens component 204 and the second lens component 203. The first lens component 204 is similar in structure and function as the first lens component 306 of the receive path Rx. For example, the first lens component 204 includes a first surface 314 and a second surface 316 of the transmit path Tx. The first surface 314 and the second surface 316 comprise aspheric surfaces that operate to generate a collimated beam 303 within the transmit channel Tx and toward the front end face of the information channel 104 downstream of the first and second lens 314, 316.

The second lens component 206 of the transmit channel Tx comprises a plano-convex lens. For example, the second lens component 206 includes a first surface 318, or, in other words, a third surface relative to the first lens component 204 within the transmit channel Tx. The third surface 204 comprise convex or converging surface that focuses the collimated beam 303 towards a center of the optical axis 208 and towards a front end face of the information channel 104, in which the front end face is a polished face configured to receive the optical beam. The second lens component 206 further includes a fourth surface 320 that is a plano surface for passing the optical beam through without further alteration or incidence.

Each of the transmit Tx and receive channels Rx include a magnification factor of the optical beam that is asymmetrical with respect to one another, in which the asymmetry is controlled according to the curvature of the fourth surface 312 of the second lens component 202 of the receive channel. Although the control of the magnification factor is within the receive channel, this is an illustrative example and the control by the fourth surface could be reversed so that the second lens component 206 of the transmit channel Tx and the second lens component 304 of the receive channel Rx are switched. This alternative would provide a change in a magnification factor of the optical beam through the transmit channel to vary with respect to the receive channel Rx having a plano-convex lens, rather than a second lens with a curved fourth surface facing the receiver component 106. Additionally, the additional vergence and/or magnification of the system provided by the fourth surface could be added (or changed) on any (or a combination thereof) of the surfaces of the lenses (first lens components or second lens components).

Although both the second lens component 206 of the transmit channel Tx and the second lens component 304 of the receive channel Rx could have a fourth curved surface, an added advantage is provided with one of the second lenses being plano in nature at the fourth surface 312 of the receive channel Rx or the fourth surface 320 of the transmit channel Tx and the other curved for further magnification control. For example, the transmit channel Tx and the receive channel Rx are able to be configured with equal or substantially equal distances in space, which enables tolerances in the control of the optical beam size to be tightly coupled. However, a magnification factor between the two channels is asymmetrical as generated by the fourth surface 312 of the second lens component 304 as illustrated in FIG. 3.

Figure 4:
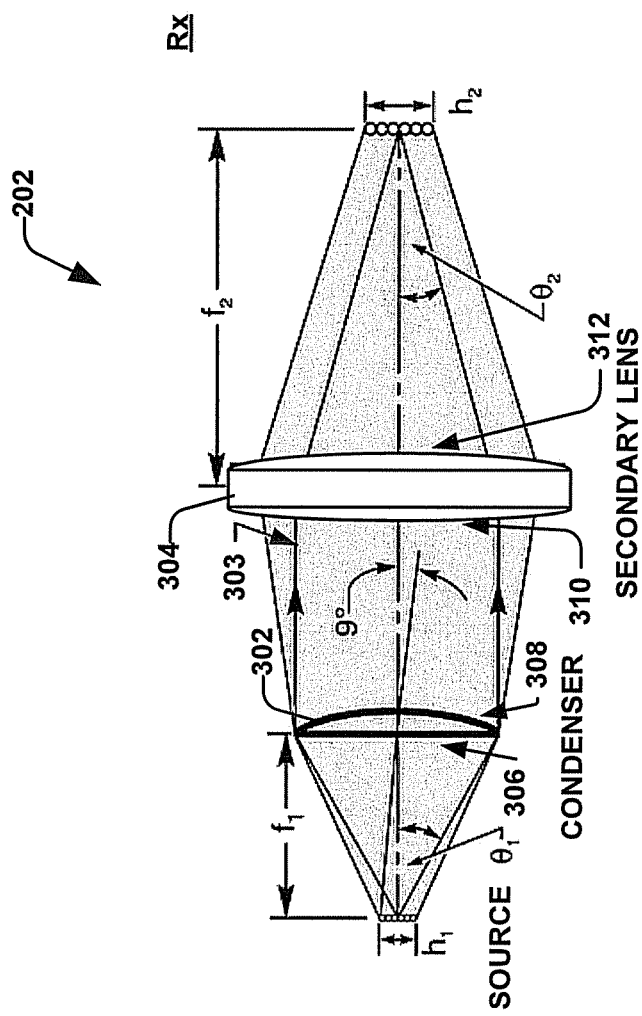
FIG. 4 illustrates an example output coupler in accordance with various aspects described herein.

Referring to FIG. 4, illustrates a collimated beam channel of an optical system in accordance with various embodiments described herein. The optical system includes the output coupler 202 including the first lens component 302 and the second lens component 304 of the receive channel Rx. The output coupler 202 includes a second lens component 304 having a fourth surface 312 that generates an asymmetrical magnification of the collimated beam 304 with respect to the transmit path Tx.

The output coupler 202 includes a source of image height $h_1$ that is a focal length or distance $f_1$ from the first lens component 302 of the receive channel Rx that is configured for generating the collimated beam 303. The angle $\theta_1$ represents the half angle of radiation of the optical beam with respect to the optical axis through a center point. The first lens component 302 provides the first surface 306 and a second surface 308, in which the first surface 306 is an aspheric surface that collects the optical beam radiating at the angle $\theta_1$.

The first lens component 302 is configured as a condenser lens that condenses the optical beam and generates the collimated beam 303, which can vary in degrees of collimation quality depending upon lens aberrations and regardless of the amount of light collected by the first surface 306 (e.g. zero to approximately nine degrees, or greater). The collimated beam 303 represents an optical beam having rays that are parallel and diverge slower while propagating along the optical axis, or with respect to distance. The collimated beams 303 is received at the third lens surface 310 that is a convergent or convex surface and operates as a secondary focusing lens for reimaging the source image.

In one example, the angle $\theta_1$ and the images height is invariant, as such the image size $h_2$ for the condenser/focusing lenses of the optical system could ideally be demonstrated by $h_2=h_1 (\theta_1/\theta_2)=h_2 (f_2/f_1)$, in which $f_2/f_1$ provides a magnification factor. The magnification factor $f_2/f_1$ represents an ideal magnification factor of the second lens component 304 with the fourth surface 312 being planar rather than curved, as illustrated with the second lens component 206 in the previous FIG. 3. Thus, the image $h_2$ in the receive channel Rx of the output coupler 202 is magnified by a magnification factor that is further provided by the fourth surface 312 as a curved or a verging surface and operates to change or tune the magnification from $f_2/f_1$ or from a different magnification than the transmit channel Tx.

Figure 5:
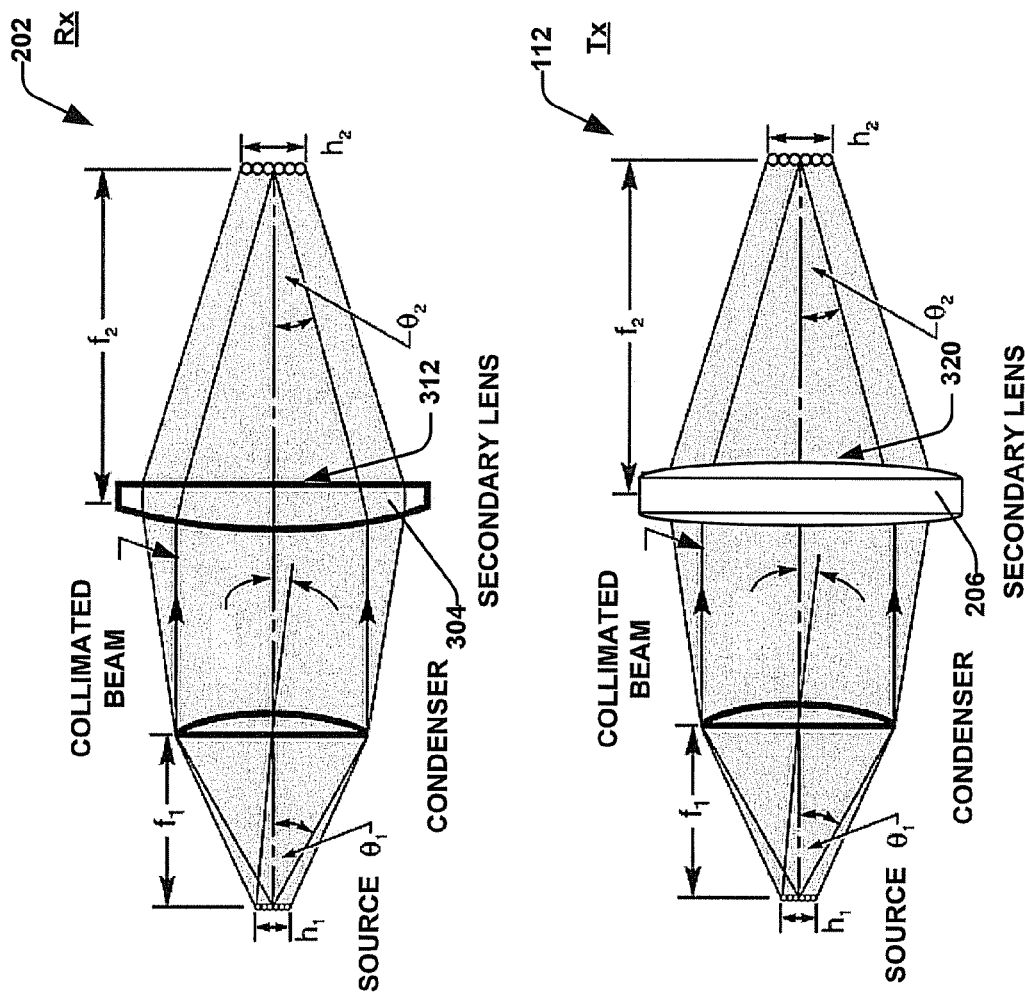
FIG. 5 illustrates another example optical system in accordance with various aspects described herein.

Referring to FIG. 5, illustrates an optical system having the receive channel Rx and the transmit channel Tx. Similar to the optical systems described above, the receive channel Rx includes the output coupler 202 and the transmit channel Tx includes the carrier coupler 112. Here, the second lens component 304 with secondary lens of the receive channel Rx has a curved fourth surface 312 that is planar and allows the optical beam to pass through without additional magnification. The second lens component 206 of the transmit channel Tx however has a fourth surface 320 that is curved or verges to provide a different magnification of the converged collimated beam than the receive channel Rx. In an alternative or additional embodiment, the fourth surface 312 and the fourth surface 320 of the receive channel Rx and the transmit channel Tx respectively could comprise similar curvatures.

Figure 6:
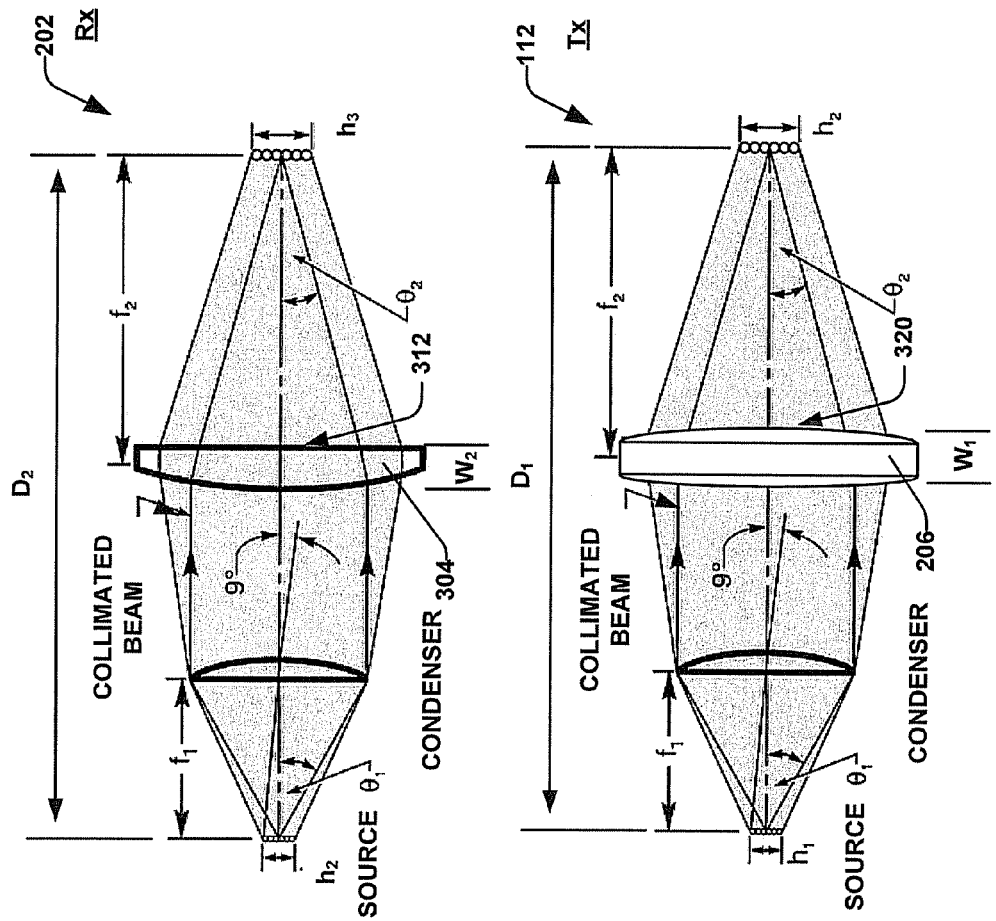
FIG. 6 illustrates another example optical system in accordance with various aspects described herein.

Referring to FIG. 6, illustrates another aspect of an optical system having the receive channel Rx and the transmit channel Tx. For example, the distances from one end point to another end point (e.g., $h_1$ to $h_2$, and $h_2$ to $h_3$) are equal or substantially similar. For example, a receive channel Rx distance $D_2$ is equal to a transmit channel Tx distance $D_1$, while the magnification factors of each channel are different or asymmetrical with respect to one another. In addition, a width $W_2$ of the second lens component 304 is equal to or substantially identical to a width $W_1$ of the second lens component 206. Consequently, a magnification factor is different within the receive channel Rx and the transmit channel Tx without altering a thickness of the secondary lens in either channel.

While the methods or process flows described within this disclosure are illustrated in and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

Figure 7:
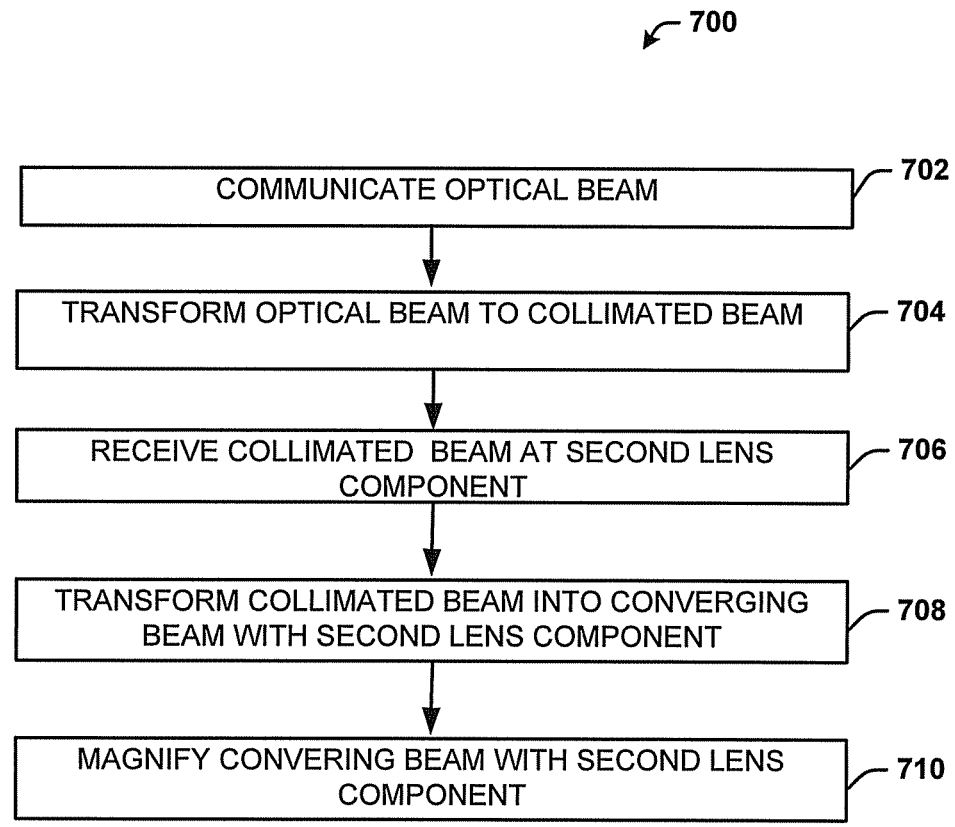
FIG. 7 illustrates an example flow diagram in accordance with various aspects described herein.

An example methodology 700 for implementing a method for an optic system having a collimated channel is illustrated in FIG. 7. Reference is made to the figures described above for ease of description. However, the method 700 is not limited to any particular embodiment or example provided within this disclosure.

FIG. 7 illustrates the exemplary method 700 for optically communicating an optical beam in a system in accordance with aspects described herein. The method 700, for example, provides for an optical system that operates to generate a very small spot size on a detector or receiver component in a signal transmission scheme.

At 702, the method begins with communicating an optical beam along an optical axis. At 704, the optical beam is transformed into a collimated beam such that rays of the optical beam are substantially parallel to one another. At 706, the method further includes receiving the collimated beam at a second lens component. At 708, the collimated beam is transformed into a converging beam with the second lens component. At 710, the converging beam is magnified with the second lens component.

In one embodiment, transmitting the optical beam includes transmitting the beam along a transmit path (transmit channel) an equal distance as a receive path (receive channel). In addition, the converging beam is magnified asymmetrically along the receive path with respect to the transmit path. For example, a four lens surface of the second lens component can differ between the receive path and the transmit path of the optical beam such that a magnification factor of the receive path is different from a magnification factor of the transmit path. For example, the receive path and the transmit path comprise equal distances and, additionally, a magnification factor of the receive path is tuneable as a multiple of a magnification factor of the transmit path. The tenability comes from an adjustment of the curvature of the fourth surface without altering a distance of the receive path and/or the transmit path.

Figure 8:
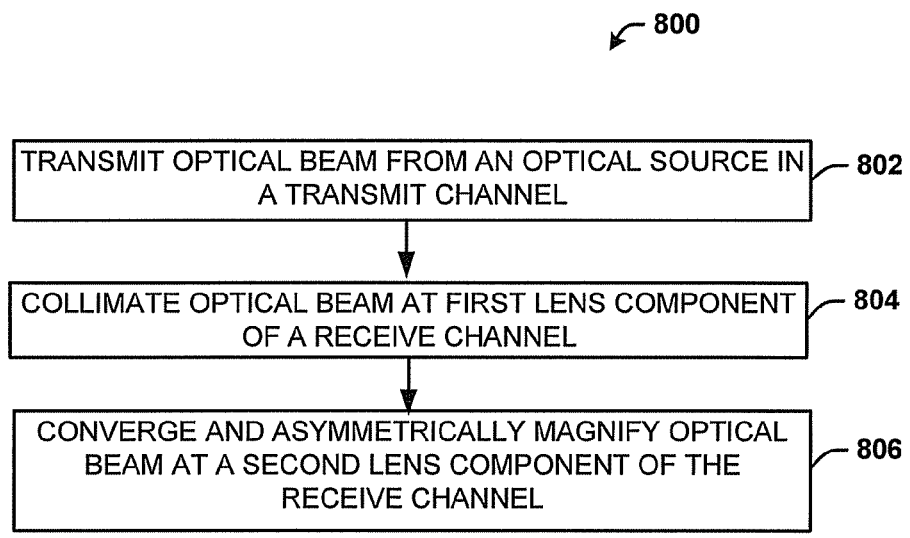
FIG. 8 illustrates another example of a flow diagram in accordance with various aspects described herein.

FIG. 8 illustrates another exemplary method 800 for optically communicating an optical beam in a system in accordance with aspects described herein. The method 800, for example, includes transmitting an optical beam from an optical source in a transmit channel, such as in a carrier coupler described herein. Additionally or alternatively, the optical beam can be transmitted via an end face of an information guide such as in an output coupler.

At 802, the optical beam is transmitted from an optical source in a transmit channel. At 804, the optical beam is collimated at a first lens component of a receive channel. At 806, the optical beam is converged and asymmetrically magnified at a second lens component of the receive channel, in which the asymmetrical magnification of the optical beam asymmetrical with respect to a different channel (e.g., the transmit channel as opposed to the receive channel, and/or vice versa).

Exemplary Networked and Distributed Environments

One of ordinary skill in the art can appreciate that the various non-limiting embodiments of the shared systems and methods described herein can be implemented in connection with any computer or other client or server device, which can be deployed as part of a computer network or in a distributed computing environment, and can be connected to any kind of data store. In this regard, the various non-limiting embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the shared shopping mechanisms as described for various non-limiting embodiments of the subject disclosure.

Figure 9:
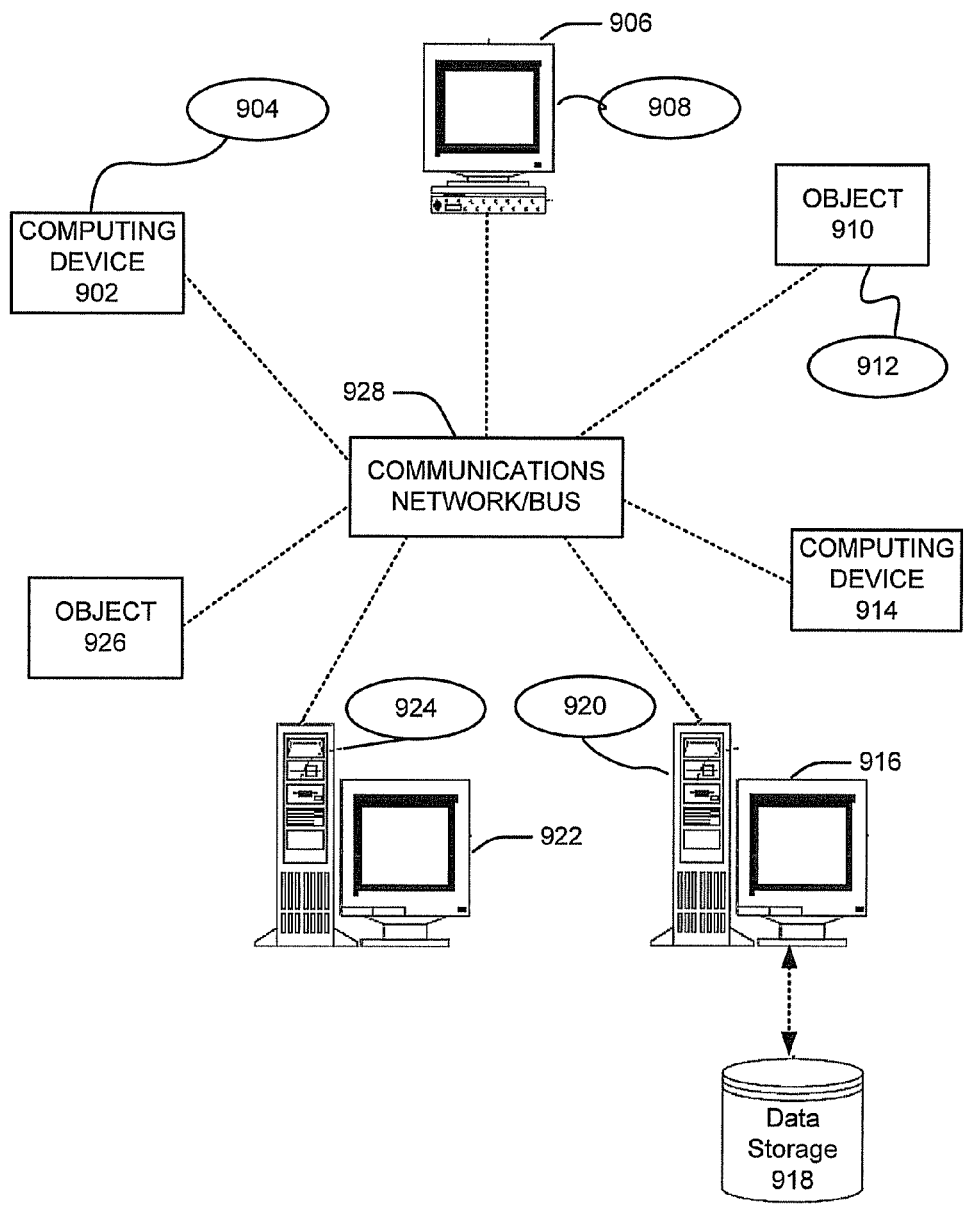
FIG. 9 is a block diagram representing exemplary non-limiting networked environments in which various non-limiting embodiments described herein can be implemented.

FIG. 9 provides a schematic diagram of an exemplary networked or distributed computing environment. The distributed computing environment comprises computing objects 910, 926, etc. and computing objects or devices 902, 906, 910, 914, etc., which may include programs, methods, data stores, programmable logic, etc., as represented by applications 904, 908, 912, 920, 924. It can be appreciated that computing objects 912, 926, etc. and computing objects or devices 902, 906, 910, 914, etc. may comprise different devices, such as personal digital assistants (PDAs), audio/video devices, mobile phones, MP3 players, personal computers, laptops, etc.

Each computing object 910, 912, etc. and computing objects or devices 920, 922, 924, 926, etc. can communicate with one or more other computing objects 910, 912, etc. and computing objects or devices 920, 922, 924, 926, etc. by way of the communications network 928, either directly or indirectly. Even though illustrated as a single element in FIG. 9, communications network 928 may comprise other computing objects and computing devices that provide services to the system of FIG. 9, and/or may represent multiple interconnected networks, which are not shown. Each computing object 910, 926, etc. or computing object or device 920, 922, 924, 926, etc. can also contain an application, such as applications 904, 908, 912, 920, 924, that might make use of an API, or other object, software, firmware and/or hardware, suitable for communication with or implementation of the shared shopping systems provided in accordance with various non-limiting embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the shared shopping systems as described in various non-limiting embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service without having to "know" any working details about the other program or the service itself.

In client/server architecture, particularly a networked system, a client is usually a computer that accesses shared network resources provided by another computer, e.g., a server. In the illustration of FIG. 9, as a non-limiting example, computing objects or devices 920, 922, 924, 926, etc. can be thought of as clients and computing objects 910, 926, etc. can be thought of as servers where computing objects 910, 926, etc., acting as servers provide data services, such as receiving data from client computing objects or devices 920, 922, 924, 926, etc., storing of data, processing of data, transmitting data to client computing objects or devices 920, 922, 924, 926, 928, etc., although any computer can be considered a client, a server, or both, depending on the circumstances. Any of these computing devices may be processing data, or requesting services or tasks that may implicate the shared shopping techniques as described herein for one or more non-limiting embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 940 or bus is the Internet, for example, the computing objects 910, 926, etc. can be Web servers with which other computing objects or devices 920, 922, 924, 926, etc. communicate via any of a number of known protocols, such as the hypertext transfer protocol (HTTP). Computing objects 910, 912, etc. acting as servers may also serve as clients, e.g., computing objects or devices 920, 922, 924, 926, etc., as may be characteristic of a distributed computing environment.

Exemplary Computing Device

As mentioned, advantageously, the techniques described herein can be applied to a number of various devices for employing the techniques and methods described herein. It is to be understood, therefore, that handheld, portable and other computing devices and computing objects of all kinds are contemplated for use in connection with the various non-limiting embodiments, i.e., anywhere that a device may wish to engage on behalf of a user or set of users. Accordingly, the below general purpose remote computer described below in FIG. 10 is but one example of a computing device.

Although not required, non-limiting embodiments can partly be implemented via an operating system, for use by a developer of services for a device or object, and/or included within application software that operates to perform one or more functional aspects of the various non-limiting embodiments described herein. Software may be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

Figure 10:
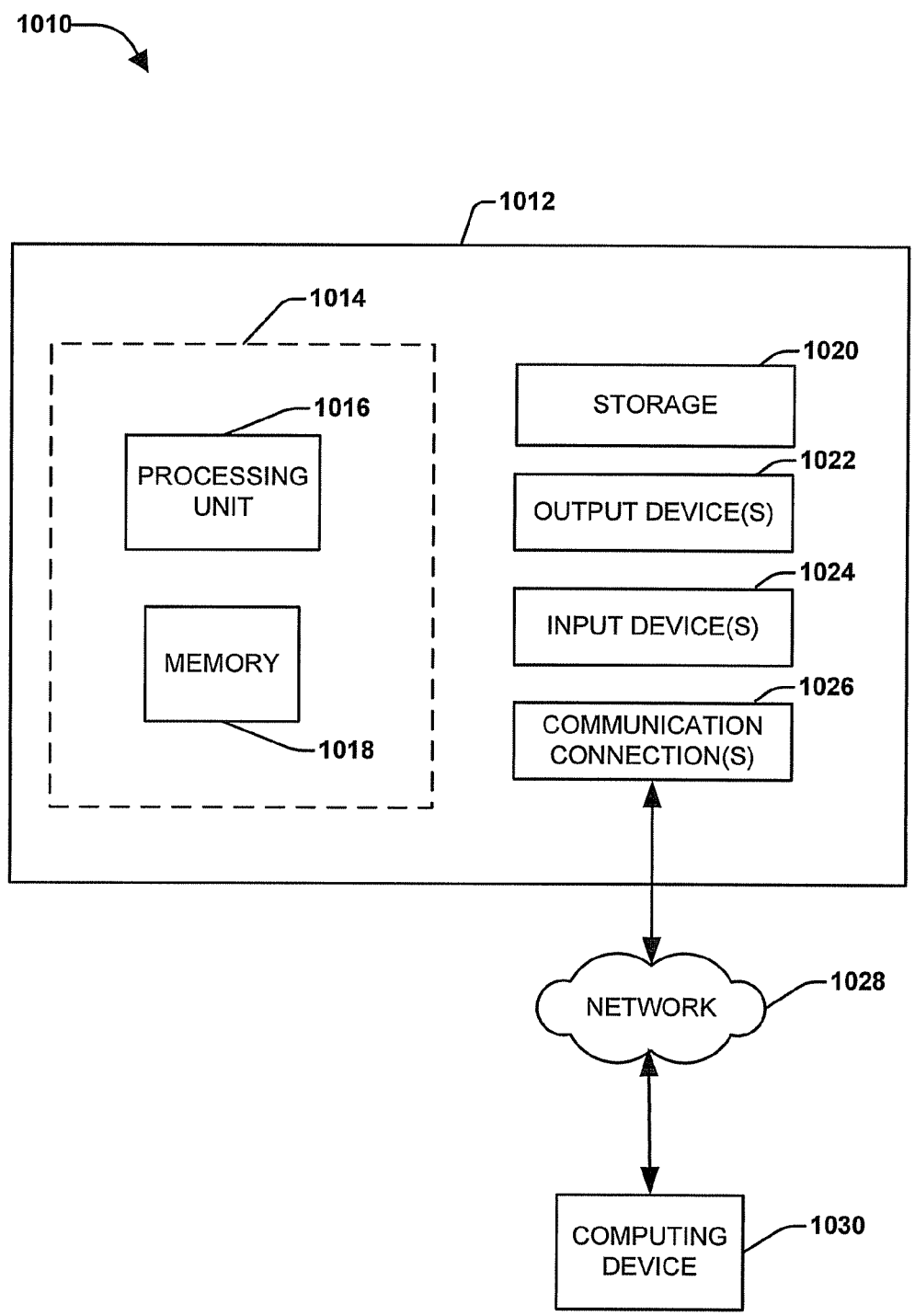

FIG. 10 and the following discussion provide a brief, general description of a suitable computing environment to implement embodiments of one or more of the provisions set forth herein. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 10 illustrates an example of a system 1010 comprising a computing device 1012 configured to implement one or more embodiments provided herein. In one configuration, computing device 1012 includes at least one processing unit 1016 and memory 1018. Depending on the exact configuration and type of computing device, memory 1018 may be volatile (such as RAM, for example), non-volatile (such as ROM, flash memory, etc., for example) or some combination of the two. This configuration is illustrated in FIG. 10 by dashed line 1014.

In other embodiments, device 1012 may include additional features and/or functionality. For example, device 1012 may also include additional storage (e.g., removable and/or non-removable) including, but not limited to, magnetic storage, optical storage, and the like. Such additional storage is illustrated in FIG. 10 by storage 1020. In one embodiment, computer readable instructions to implement one or more embodiments provided herein may be in storage 1020. Storage 1020 may also store other computer readable instructions to implement an operating system, an application program, and the like. Computer readable instructions may be loaded in memory 1018 for execution by processing unit 1016, for example.

The term "computer readable media" as used herein includes computer storage media. Computer storage media includes volatile and nonvolatile, removable and non-removable media implemented in any method or technology for storage of information such as computer readable instructions or other data. Memory 1018 and storage 1020 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1012. Any such computer storage media may be part of device 1012.

Device 1012 may also include communication connection(s) 1026 that allows device 1012 to communicate with other devices. Communication connection(s) 1026 may include, but is not limited to, a modem, a Network Interface Card (NIC), an integrated network interface, a radio frequency transmitter/receiver, an infrared port, a USB connection, or other interfaces for connecting computing device 1012 to other computing devices. Communication connection(s) 1026 may include a wired connection or a wireless connection. Communication connection(s) 1026 may transmit and/or receive communication media.

The term "computer readable media" as used herein includes computer readable storage media and communication media. Computer readable storage media includes volatile and nonvolatile, removable and non-removable media implemented in any method or technology for storage of information such as computer readable instructions or other data. Memory 1018 and storage 1020 are examples of computer readable storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1012. Any such computer readable storage media may be part of device 1012.

Device 1012 may also include communication connection(s) 1026 that allows device 1012 to communicate with other devices. Communication connection(s) 1026 may include, but is not limited to, a modem, a Network Interface Card (NIC), an integrated network interface, a radio frequency transmitter/receiver, an infrared port, a USB connection, or other interfaces for connecting computing device 1012 to other computing devices. Communication connection(s) 1026 may include a wired connection or a wireless connection. Communication connection(s) 1026 may transmit and/or receive communication media.

The term "computer readable media" may also include communication media. Communication media typically embodies computer readable instructions or other data that may be communicated in a "modulated data signal" such as a carrier wave or other transport mechanism and includes any information delivery media. The term "modulated data signal" may include a signal that has one or more of its characteristics set or changed in such a manner as to encode information in the signal.

Device 1012 may include input device(s) 1024 such as keyboard, mouse, pen, voice input device, touch input device, infrared cameras, video input devices, and/or any other input device. Output device(s) 1022 such as one or more displays, speakers, printers, and/or any other output device may also be included in device 1012. Input device(s) 1024 and output device(s) 1022 may be connected to device 1012 via a wired connection, wireless connection, or any combination thereof. In one embodiment, an input device or an output device from another computing device may be used as input device(s) 1024 or output device(s) 1022 for computing device 1012.

Components of computing device 1012 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1012 may be interconnected by a network. For example, memory 1018 may be comprised of multiple physical memory units located in different physical locations interconnected by a network.

Those skilled in the art will realize that storage devices utilized to store computer readable instructions may be distributed across a network. For example, a computing device 1030 accessible via network 1028 may store computer readable instructions to implement one or more embodiments provided herein. Computing device 1012 may access computing device 1030 and download a part or all of the computer readable instructions for execution. Alternatively, computing device 1012 may download pieces of the computer readable instructions, as needed, or some instructions may be executed at computing device 1012 and some at computing device 1030.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. An optical system, comprising:
    an optical transmitter component configured for converting a message having a first format into a second different format for a transmission of the message;
    an optical receiver component configured for receiving the message in the second different format;
    an information channel component configured for carrying the message in the second different format along a guided pathway having a receive channel and a transmit channel;
    a first lens component configured for generating a collimated beam along an optical axis; and
    a second lens component configured for directing and magnifying the collimated beam with an asymmetrical magnification factor with respect to the receive channel and the transmit channel.

2. The system of claim 1, wherein the first lens component includes a first surface and a second surface that is opposite to the first surface, wherein the first surface and the second surface comprise an aspheric surface respectively.

3. The system of claim 2, wherein the second lens component includes a third surface having an aspheric surface and a fourth surface that is opposite to the third aspheric surface.

4. The system of claim 1, wherein the receive channel comprises a first length and the transmit channel comprises a second length that is equal to the first length.

5. The system of claim 1, wherein the receive channel comprises a receive channel magnification factor that is different from a transmit channel magnification factor of the transmit channel.

6. The system of claim 1, wherein the optical receiver component includes a photo detector component configured to receive the message in the second different format that comprises an optical format from the second lens component.

7. The system of claim 1, wherein the information channel includes a fiber optic communication pathway having multiple modes for transmitting optical information.

8. The system of claim 1, wherein the information channel includes at least one end face having a polished surface configured for receiving the collimated beam through the second lens component.

9. The system of claim 8, wherein the second lens component includes a convex surface and a verging surface that is opposite to the convex surface and downstream of the first lens within the receive channel, wherein the verging surface is configured for selectively magnifying the collimated beam onto a photo detector without altering a width of the second lens.

10. A method of optically communicating an optical beam, comprising:
    transmitting, via a beam source component, the optical beam along an optical axis of a transmit path;
    transforming the optical beam at a first lens component having a first aspheric surface and a second aspheric surface opposite to the first aspheric surface into a collimated beam;
    receiving the collimated beam with a second lens component downstream of the first lens component at a third convergent surface;
    transforming the collimated beam into a converging beam; and
    magnifying the converging beam along a receive path with a fourth verging surface that is opposite to the third convergent surface of the second lens component.

11. The method of claim 10, wherein the transmitting the optical beam includes transmitting along the transmit path an equal distance as magnifying the converging beam along the receive path.

12. The method of claim 10, wherein the magnifying includes magnifying the converging beam along the receive path with an asymmetrical magnification factor with respect to the transmit path.

13. The method of claim 12, wherein the receive path and the transmit path comprise equal distances and a magnification factor of the receive path is tuneable as a multiple of a magnification factor of the transmit path.

14. The method of claim 10, further comprising:
    focusing the magnified converging beam at a fiber end face of an optic fiber or a photo detector.

15. The method of claim 10, further comprising:
    altering a magnification of the converging beam with the fourth verging surface that is a curved surface from a magnification of the collimated beam.

16. The method of claim 10, further comprising:
    capturing the magnified converging beam at a fiber end face of an optic fiber having a plurality of modes and communicating optical information of the optical beam to a photo detector.

17. A system, comprising:
    a collimated beam channel configured for optically coupling a beam source to a fiber optic guided pathway;
    wherein the collimated beam channel comprises:
        a first optical lens component configured for receiving an optical beam from the beam source and generating a collimated beam along an optical axis, the first optical lens component including a first aspheric surface configured for receiving the optical beam and a second aspheric surface opposite to the first aspheric surface;
        a second optical lens component configured for receiving the collimated beam at a third convex surface and magnifying the received collimated beam with a fourth curved surface towards an end face of the fiber optic guided pathway.

18. The system of claim 17, further comprising:
a receive channel and a transmit channel that comprise an equal length.

19. The system of claim 17, wherein the receive channel includes a different magnification factor than the transmit channel.

20. The system of claim 19, wherein the second optical lens component is further configured to tune a magnification factor of the receive channel from a first magnification factor to a second different magnification factor without adjusting a thickness or a width of a lens.

* * * * *